(12) United States Patent
Hongou (10) Patent No.: US 8,790,054 B2
(45) Date of Patent: Jul. 29, 2014

(54) SPINDLE ATTACHMENT DEVICE

(75) Inventor: Wataru Hongou, Aichi (JP)

(73) Assignee: Okuma Corporation, Aichi (JP)

( * ) Notice: Subject to any disclaimer, the term of this patent is extended or adjusted under 35 U.S.C. 154(b) by 1000 days.

(21) Appl. No.: 12/805,522

(22) Filed: Aug. 4, 2010

(65) Prior Publication Data

US 2011/0052342 A1 Mar. 3, 2011

(30) Foreign Application Priority Data

Sep. 1, 2009 (JP) ................................. 2009-201236

(51) Int. Cl.
*B23C 7/00* (2006.01)
*B23Q 5/20* (2006.01)
*B23Q 5/04* (2006.01)

(52) U.S. Cl.
USPC ........... 409/233; 409/232; 409/231; 409/230; 409/144; 29/27 A; 29/27 C; 29/27 R; 173/164

(58) Field of Classification Search
USPC .......... 402/233, 232, 231, 144, 230; 29/27 A, 29/27 C, 27 R; 173/164; 409/233, 232, 231, 409/144, 230
See application file for complete search history.

(56) References Cited

U.S. PATENT DOCUMENTS

| 4,570,313 | A | * | 2/1986 | Holmstrom et al. ........... 29/26 A |
| 4,709,465 | A | * | 12/1987 | Lewis et al. ........................ 483/7 |
| 5,027,682 | A | * | 7/1991 | Aiso et al. ........................ 82/142 |
| 5,322,494 | A | * | 6/1994 | Holtey et al. .................... 483/12 |
| 6,865,789 | B2 | * | 3/2005 | Katoh et al. ....................... 29/40 |
| 2007/0154274 | A1 | * | 7/2007 | Petrescu ........................ 409/233 |

FOREIGN PATENT DOCUMENTS

| JP | 59-219129 A | 12/1984 |
| JP | 6-335835 A | 12/1994 |
| JP | 08318443 A | * 12/1996 ............. B23Q 3/157 |

OTHER PUBLICATIONS

Chinese Office Action dated Nov. 21, 2013, issued in corresponding Chinese Patent Application No. 201010269149.1(8 pages).

* cited by examiner

*Primary Examiner* — Sarang Afzali
(74) *Attorney, Agent, or Firm* — Westerman, Hattori, Daniels & Adrian, LLP

(57) ABSTRACT

A spindle attachment includes a device body having an attachment surface detachably attached to an end face of a spindle head. Fixed and movable teeth move the body in a direction of an axial line of the spindle to engage the spindle head and the body so as to freely restrict or release rotation of the body with respect to the spindle head. A coil spring urges the body so that the attachment surface is pressed onto the end face of the spindle head with the fixed and movable teeth ready for engagement. A pressure cylinder causes fluid pressure to act on the attachment surface against the spring force to release engagement between the fixed and movable teeth. A key and a key groove transmit rotation of the spindle to the body with the fluid pressure of the cylinder acting on the attachment surface of the device body.

6 Claims, 6 Drawing Sheets

SPINDLE ATTACHMENT DEVICE

This application has a priority of Japanese no. 2009-201236 filed Sep. 1, 2009, hereby incorporated by reference.

BACKGROUND OF THE INVENTION

This invention relates to a spindle attachment device that attaches a cutting device used for a machine tool to a spindle head.

In the past, a known example of this kind of device is a device including a device body having an attachment surface detachably attached to an end face of a spindle head and engaging means for engaging the spindle head and the device body by moving the device body in a direction of an axial line of the spindle so as to be able to freely restrict or release rotation of the device body with respect to the spindle head about the axial line thereof, wherein a pull stud is supported on the device body in such a manner as to freely move in an axial direction thereof, wherein when the axial line of the pull stud agrees with the axial line of the spindle, the pull stud is inserted into an axial hole of the spindle and coupled with a drawbar, in which state the device body descends due to its own weight, and wherein in this state, the device body is hung from the spindle head by the pull stud, and the device has transmission means for transmitting rotation of the spindle to the device body in this state (for example, see Japanese Unexamined Patent Publication No. S59-219129).

In this conventional device, when the engagement of the engaging means is released and the device body is rotated, the device body is hung from the spindle head, in which state the posture of the rotation thereof is extremely unstable. Therefore, after the device body is rotated, it is difficult to raise the device body and bring the engaging means into engagement.

In addition, after the engaging means is brought into engagement, the posture of the device body is unstable during rotation, which may necessitate engagement between the spindle head and the device body. In this case, since the posture of the device body is unstable during rotation, it is necessary to arrange a large engagement gap. However, if a large engagement gap is arranged, there is a possibility that a foreign material may enter into the spindle head from the gap.

SUMMARY OF THE INVENTION

It is an object of this invention to provide a spindle attachment device capable of rotating a device body in a stable posture when an attachment surface of the device body is attached to or detached from an end face of a spindle head. A spindle attachment device according to this invention includes a device body having an attachment surface detachably attached to an end face of a spindle head, engaging means for moving the device body in a direction of a axial line of a spindle to engage the spindle head and the device body with each other so as to freely restrict or release rotation of the device body with respect to the spindle head about the axial line of the spindle, spring means for urging the device body so that the attachment surface of the device body is pressed onto the end face of the spindle head with the engaging means being ready for engagement, fluid pressure means for causing a fluid pressure to act on the attachment surface of the device body against spring force of the spring means so that the engagement of the engaging means is released, and transmission means for transmitting rotation of the spindle to the device body with the fluid pressure of the fluid pressure means acting on the attachment surface of the device body.

In the spindle attachment device according to this invention, when the device body is rotated, the fluid pressure means can cause the fluid pressure to act on the attachment surface of the device body against the spring force of the spring means.

Therefore, when the attachment surface of the device body is attached to or detached from the end face of the spindle head, the device body can be rotated in a stable posture.

Further, the engaging means may include fixed teeth arranged on a circumference, whose center is the axial line of the spindle, on the end face of the spindle head, and movable teeth arranged on a circumference, having the same diameter as the circumference on which the fixed teeth are formed, on the attachment surface of the device body. In such a case, a desired number of fixed teeth and a desired number of the movable teeth can be arranged appropriately, and it is easy to synchronize the fixed teeth and the movable teeth.

Still further, a guide hole may be formed at a center of the circumference, on which the movable teeth are formed, of the attachment surface of the device body, and a pull stud may be inserted into an axial hole of the spindle so as to allow coupling with a drawbar, wherein the pull stud may be inserted into the guide hole in such a manner that the pull stud can move in the direction of the axis thereof, and an annular space may be formed between the peripheral surface of the guide hole and external surface of the pull stud, wherein an inward flange may be arranged on the peripheral surface of the guide hole, and an outward flange may be arranged on the external surface of the pull stud, and wherein the spring means may have a compressed coil spring accommodated in the annular space and transposed between the outward flange and the inward flange. In such a case, the pull stud and the compressed coil spring are effectively used, and the spring force can be effectively used as pressure force exerted by the spring means.

Still further, a cylinder may be arranged concentrically with the axial line of the spindle, and wherein the fluid pressure means may have a piston accommodated in the cylinder in such a manner that one end of the piston protrudes from the cylinder so as to be able to come in contact with the attachment surface of the device body. In such a case, the fluid pressure of the fluid pressure means can be effectively exerted on the spindle head.

Still further, a movable clamp may be coupled with the protruding end of the piston, and a fixed clamp capable of clamping the movable clamp may be arranged on the attachment surface of the device body, so that according to rotation of the device body about the axial line of the spindle, the fixed clamp can be positioned at an unclamp position and a clamp position with respect to the movable clamp, such that the fixed clamp at the unclamp position can freely move with respect to the movable clamp in the direction of the axis, and the movable clamp can come into engagement from the device body side with the fixed clamp at the clamp position. In such a case, by using the rotation of the device body, the movable clamp and the fixed clamp can be clamped and unclamped.

Still further, the transmission means may include a key arranged on the end face of the spindle and a key groove formed on the attachment surface of the device body, and wherein the key can be fitted into the key groove. In such a case, the transmission means can be made with an extremely simple structure.

According to this invention, the device body can be forcibly pressed by the pressing means, and when the attachment surface of the device body is attached to or detached from the end face of the spindle head, the device body can be rotated in a stable posture.

DETAILED DESCRIPTION OF THE PREFERRED EMBODIMENTS

Figure 1:
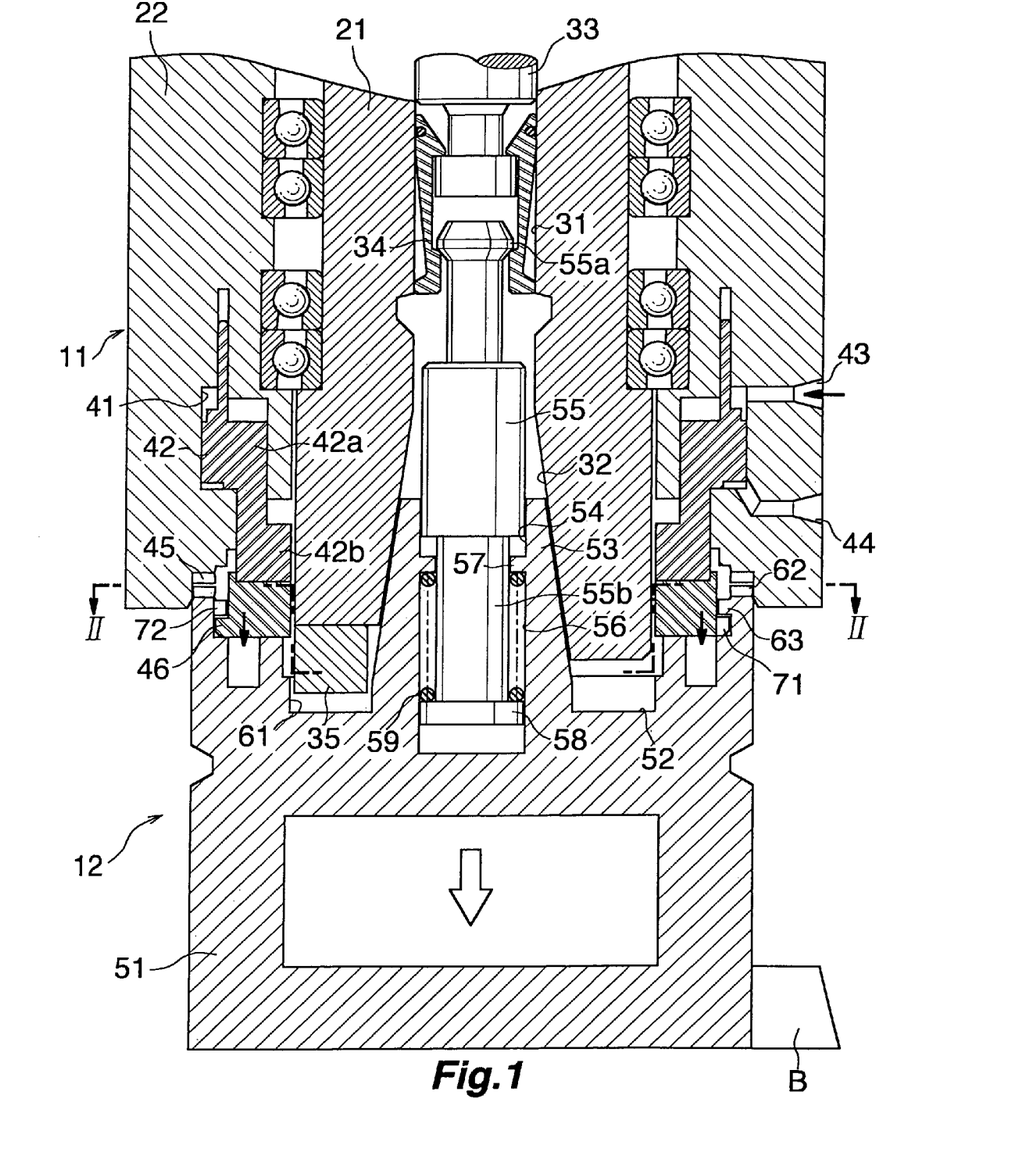
FIG. 1 is a vertical longitudinal sectional view illustrating an attachment device according to this invention.

FIG. 1 mainly shows a spindle device 11 of a large vertical complex processing machine capable of performing processing with a milling tool (not shown) directly attached to a spindle, and an attachment device 12 for attaching a cutting tool to the spindle.

In this embodiment, the attachment device 12 attaches a turning tool B to the spindle.

The spindle device 11 includes a vertical spindle 21 and a spindle head 22 supporting the spindle 21.

The spindle 21 includes a central hole 31. The lower end section of the central hole 31 is formed with a downward tapered hole 32. The central hole 31 houses a drawbar 33. The lower end section of the drawbar 33 is arranged with a collet 34. Two drive keys 35 are fixed on a circumference, whose center is an axial line of the spindle, on a lower end face of the spindle 21 (see FIGS. 2A and 2B). The two drive keys 35 are fixed thereon with a regular interval in a circumferential direction. It should be noted that the spindle 21, the drawbar 33, the drive key 35, and the like are structured as a known spindle that attaches and rotates a known rotational tool, or performs known action for transmitting power to a rotational tool via the drive key and the like when a rotational tool attachment is attached.

The lower end face of the spindle head 22 is positioned at a level above the lower end face of the spindle 21. Above the lower end face of the spindle head 22, a cylinder 41 having a ring-shaped cross section is formed concentrically with the axial line of the spindle. A tube-shaped piston 42 is inserted into the cylinder 41. The piston 42 includes a large-diameter upper piston 42a housed in the cylinder 41 and a small-diameter lower piston 42b continuing from a lower end of the upper piston 42a. The lower piston 42b penetrates through a bottom wall of the cylinder 41, and protrudes downward from the lower end face of the spindle head 22. The lower piston 42b encircles the spindle 21.

An upper port 43 is arranged in a space above the upper piston 42a, and a lower port 44 is arranged in a space below within the cylinder 41. Each of the upper port 43 and the lower port 44 penetrates through the cylinder.

Many fixed teeth 45 are formed downward on an outer side of the lower piston 42b in a radial direction on the lower end face of the spindle head 22. On the lower end face of the lower piston 42b, a movable clamp 46 in a horizontal ring shape is fixed concentrically with the axial line of the spindle.

The attachment device 12 has a device body 51 having a turning tool B protruding in the radial direction of the axial line of the spindle.

A top face of the device body 51 is formed with an upward recessed section 52 accommodating the lower end section of the spindle 21 and the movable clamp 46. A guide tube 53 is arranged in the center of the bottom surface of the recessed section 52. The guide tube 53 is inserted into the tapered hole 32, and the exterior surface of the guide tube 53 is formed in an upward tapered shape. A cylindrical guide hole 54 having a bottom is formed on an inner surface of the guide tube 53. A pull stud 55 is held in the guide hole 54. A radial direction protrusion 55a sandwiched by the collet 34 is formed at an upper end section of the pull stud 55. A vertical rod-shaped guide rod 55b is arranged on a lower half of the pull stud 55. The vertical rod-shaped guide rod 55b is inserted into the guide hole 54 so that the vertical rod-shaped guide rod 55b can freely slide upward and downward.

A vertical cylindrical space 56 is formed between the peripheral surface of the guide hole 54 and the outer surface of the guide rod 55b. An inward flange 57 is arranged in proximity to the upper end of the peripheral surface of the guide hole 54. An outward flange 58 is arranged on a lower end section of the outer surface of the guide rod 55b. A compressed coil spring 59 is accommodated within the annular space 56 in such a manner that the compressed coil spring 59 is vertically sandwiched by the inward flange 57 and the outward flange 58. On the outside of the guide tube 53, two key grooves 61 are formed on the bottom surface of the recessed section 52. The drive keys 35 are respectively inserted into the two key grooves 61.

On the outer edge of the top face of the device body 51, many movable teeth 62 are formed upward so as to face the fixed teeth 45.

A ring-shaped fixing clamp 63 is arranged at a slightly inner side of the movable teeth 62 on the peripheral surface of the recessed section 52. The ring-shaped fixing clamp 63 is arranged at a low level such that the ring-shaped fixing clamp 63 is positioned at a level below the movable clamp 46.

Figure 2:
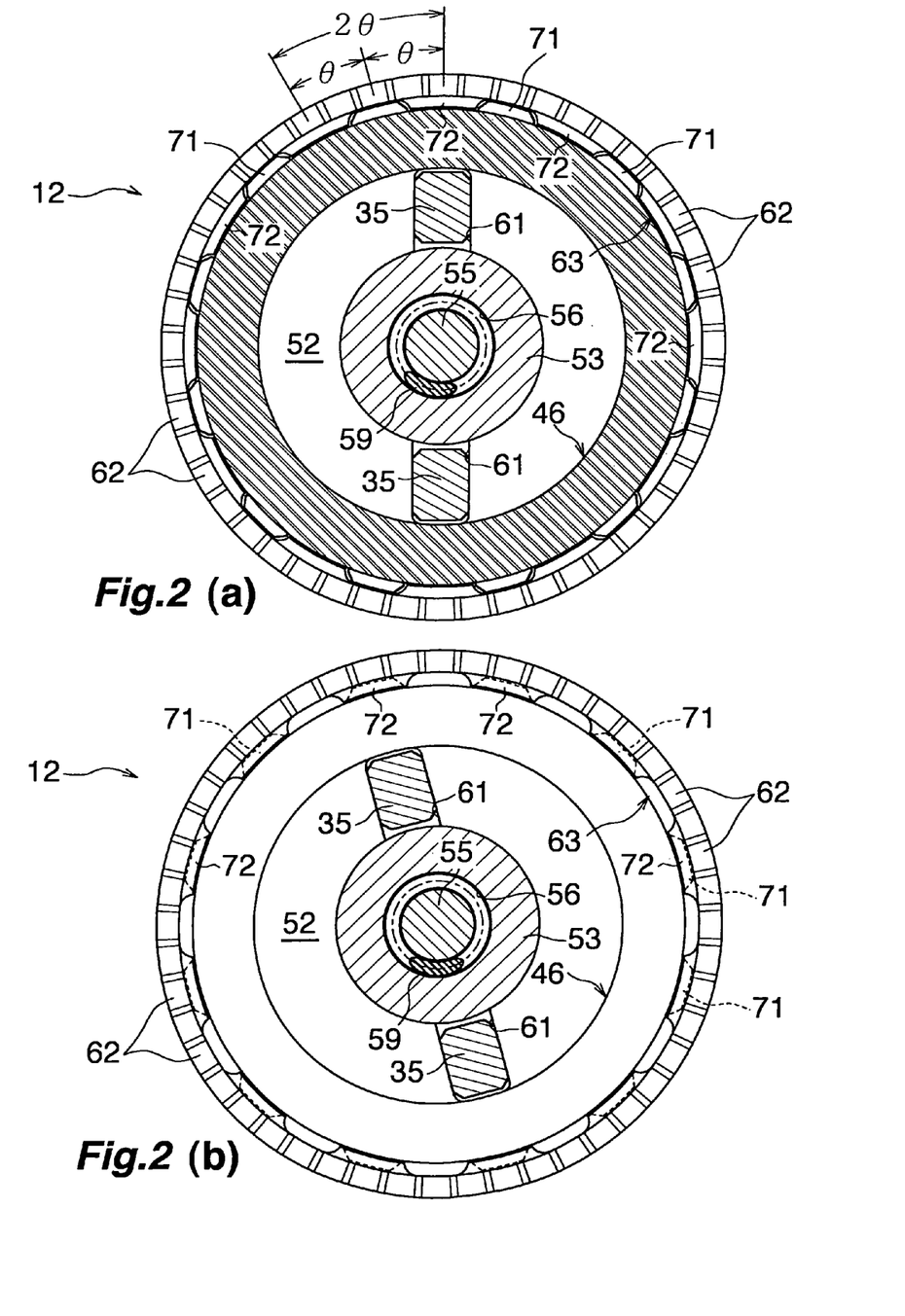
FIGS. 2A and 2B are horizontal transverse sectional views taken along line II-II of FIG. 1.

FIGS. 2A and 2B show a relationship of the phases among the fixed teeth 45, the movable teeth 62, the movable clamp 46, and the fixed clamp 63. The movable teeth 62 are aligned in one row with a regular pitch θ on a circumference, whose center is the axial line of the spindle, in a circumferential direction thereof. Although the fixed teeth 45 are not shown in the figures, the fixed teeth 45 have the same structure as the movable teeth 62 but are oppositely oriented in the vertical direction.

On the outer edge of the movable clamp 46, many outward claws 71 are arranged in a circumferential direction thereof with a regular pitch 2θ. On the inner edge of the movable clamp 63, many inward claws 72 are arranged in a circumferential direction thereof with a pitch 2θ that is the same pitch as the pitch 2θ of the outward claws 71. The pitch 2θ of the outward claws 71 and the inward claws 72 is twice the pitch θ of the movable teeth 62.

In FIG. 2A, the fixed teeth 45 and the movable teeth 62 can engage with each other in the direction of the axial line of the spindle. One outward claw 71 is positioned between two adjacent inward claws 72. In this state, when the movable clamp 46 is moved with respect to the fixed clamp 63 in the direction of the axial line of the spindle, one outward claw 71 can pass between two inward claws 72. Accordingly, the fixed clamp 63 and the movable clamp 46 do not clamp. In other words, the movable clamp 46 is positioned at an unclamp position.

The state shown in FIG. 2A is changed to the state shown in FIG. 2B, when the device body 51 is rotated and the fixed clamp 63 is rotated by the pitch θ of the movable teeth 62. Even in this state, the fixed teeth 45 and the movable teeth 62 can engage with each other, but the fixed clamp 63 and the movable clamp 46 are overlapped in the direction of the axial line of the spindle. When the movable clamp 46 moves with respect to the fixed clamp 63 in the direction of the axial line of the spindle, the inward claws 72 and the outward claws 71 clamp each other. The movable clamp 46 is positioned at a clamp position.

With reference to FIGS. 3 to 6, attachment operation of the attachment device 12 will be described.

Figure 3:
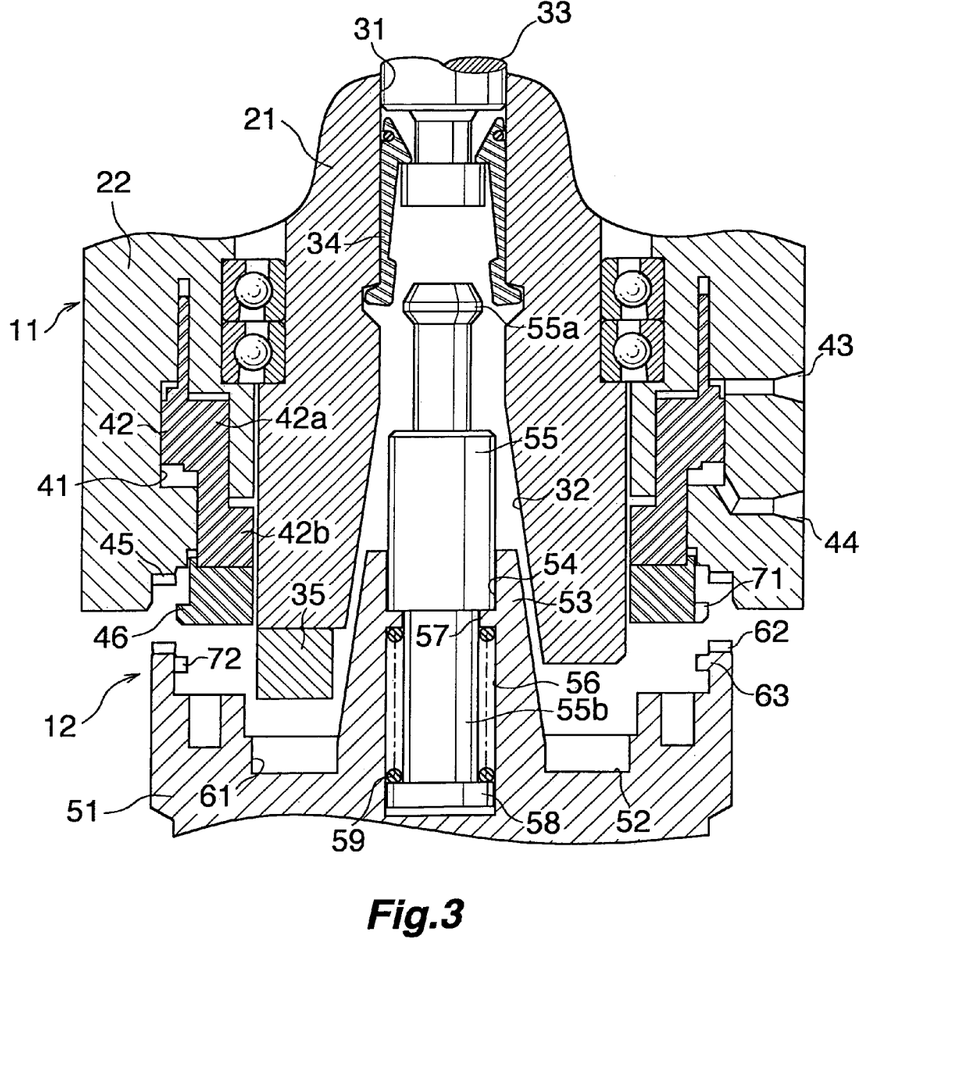
FIG. 3 is an explanatory diagram illustrating operation of the device.

The device body 51 is conveyed to a place below the spindle device 11 by a tool replacement apparatus (not shown), and is thereafter moved upward by an upward stroke. FIG. 3 illustrates the device body 51 immediately before the device body 51 stops ascending at the uppermost position in the upward stroke.

The drawbar 33 is positioned at the lowermost position of the upward/downward stroke. The collet 34 is opened. Pressurized oil is supplied to the lower port 44, and the piston 42 is positioned at the uppermost position of the upward/downward stroke thereof. On the other hand, the pull stud 55 is pulled into the guide tube 53 by force of the spring 59. The fixed clamp 63 is positioned at a level below the movable clamp 46. The phases of the fixed teeth 45 and the movable teeth 62 are such that they can engage with each other, and the movable clamp 46 is positioned at the unclamp position.

Figure 4:
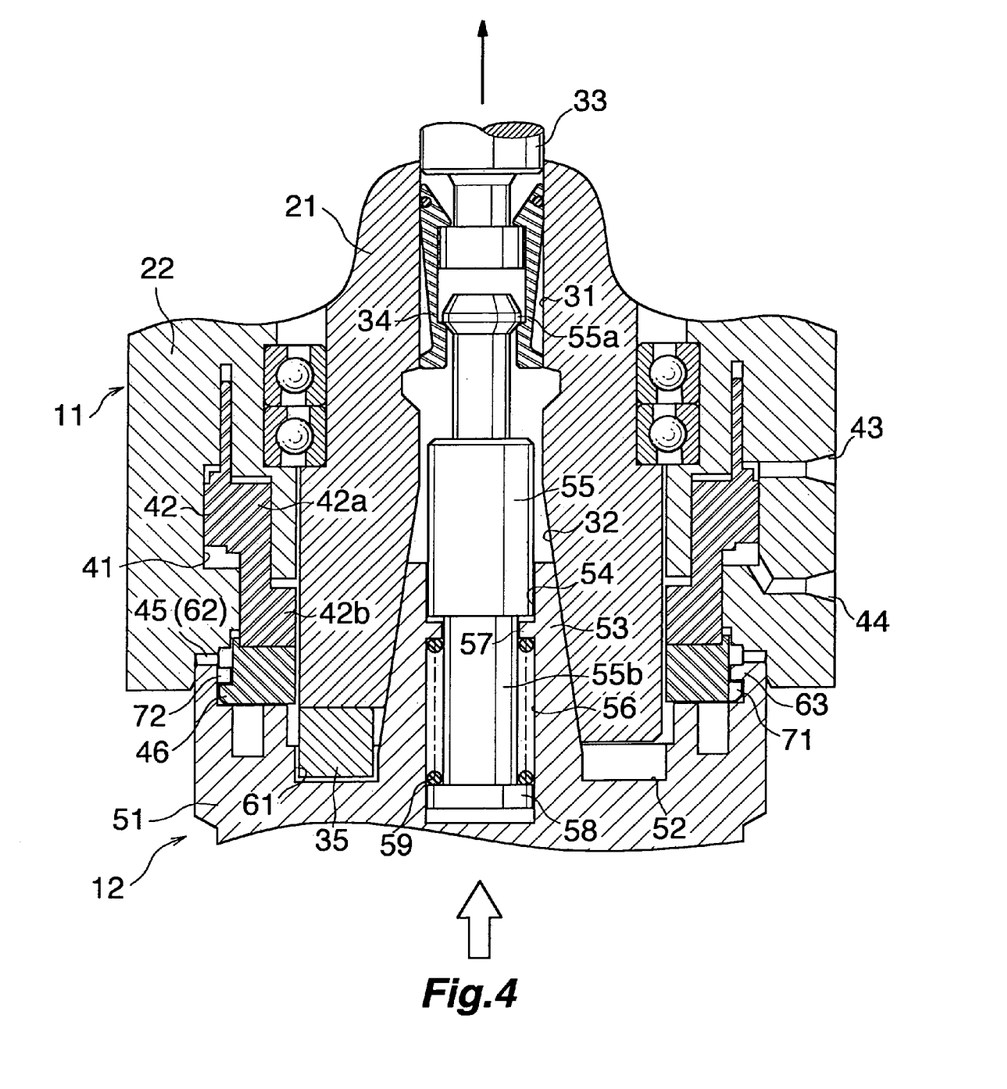
FIG. 4 is an explanatory diagram illustrating operation of the device, subsequent to FIG. 3.

Then, as shown in FIG. 4, the tool replacement apparatus further moves the device body 51 upward to raise the device body 51 to the uppermost position. The fixed teeth 45 and the movable teeth 62 engage each other. The movable clamp 46 is positioned at a level below the fixed clamp 63. There is a space between the bottom surface of the recessed section 52 of the device body 51 and the lower surface of the movable clamp 46.

The guide tube 53 is inserted into the tapered hole 32. The drawbar 33 is raised, and the collet 34 is closed. Accordingly, the collet 34 sandwiches the protrusion 55a of the pull stud 55, which prevents the pull stud 55 from descending. The keys 35 are inserted into the key grooves 61.

Figure 5:
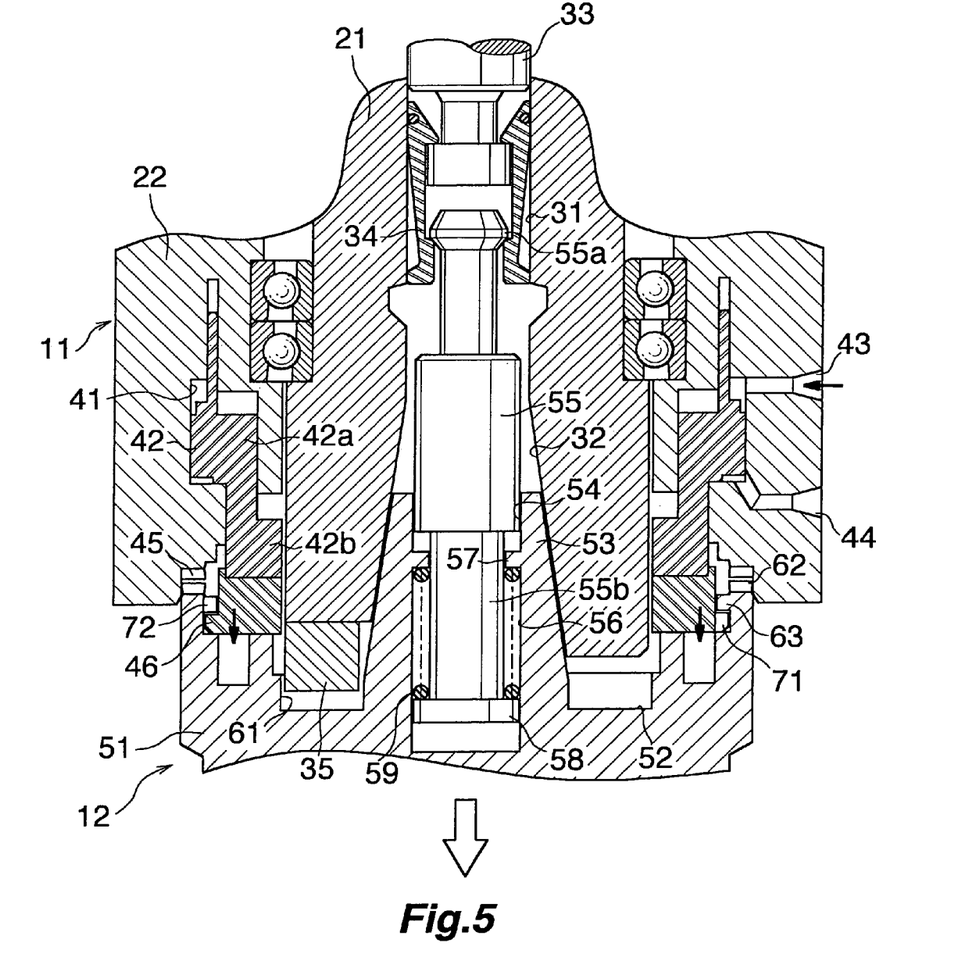
FIG. 5 is an explanatory diagram illustrating operation of the device, subsequent to FIG. 4.

When the lower port 44 is opened to supply pressurized oil to the upper port 43, the piston 42 descends as shown in FIG. 5. The movable clamp 46 as well as the piston 42 descends. Accordingly, the descending movable clamp 46 comes in contact with and presses the bottom surface of the recessed section 52 of the device body 51. The device body 51 descends against the force of the spring 59. The pull stud 55 is pulled out of the guide tube 53. The engagement between the fixed teeth 45 and the movable teeth 62 are disengaged.

Then, when the spindle 21 is rotated, the rotation thereof is transmitted to the device body 51 via the keys 35 and the key grooves 61. While the movable clamp 46 presses the bottom surface of the recessed section 52 of the device body 51, the device body 51 is rotated by the pitch θ of the movable teeth 62. The movable clamp 46 is placed at the clamp position.

Figure 6:
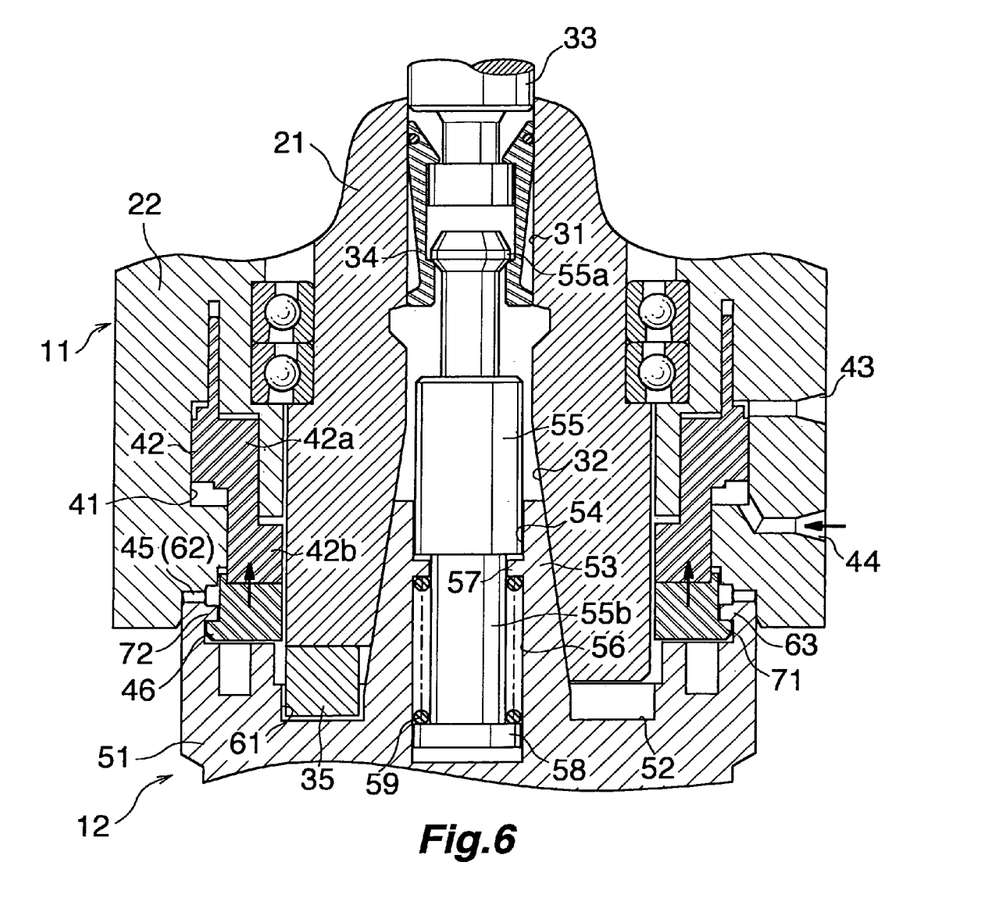
FIG. 6 is an explanatory diagram illustrating operation of the device, subsequent to FIG. 5.

At the last, the upper port 43 is opened to supply pressurized oil to the lower port 44, so that the piston 42 ascends as shown in FIG. 6. Accordingly, the fixed clamp 63 and the movable clamp 46 clamp each other, and the fluid pressure acting on the piston 42 is transmitted to the device body 51. This pressure binds the engaging state between the fixed teeth 45 and the movable teeth 62. Therefore, processing can be performed with the turning tool B.

In the state shown in FIG. 6, there is a gap between the peripheral surface of the tapered hole 32 of the spindle 21 and the outer surface of the guide tube 53. If, arguendo, there were no gap, the both surfaces would interfere with each other, and the fluid pressure might not be sufficiently transmitted to the fixed teeth 45 and the movable teeth 62.

The spindle attachment device according to this invention is suitable for attaching a cutting device used for a machine tool to the spindle head.

The invention claimed is:

1. A spindle attachment device for attachment to an end face of a spindle head engaging a spindle having an axial line, the attachment device comprising:
a device body having an attachment surface detachably attached to the end face of the spindle head;
engaging means for moving the device body in a direction of the axial line of the spindle to engage the spindle head and the device body with each other so as to freely restrict or release rotation of the device body with respect to the spindle head about the axial line of the spindle;
spring means exerting a spring force for urging the device body so that the attachment surface of the device body is pressed onto the end face of the spindle head with the engaging means being ready for engagement;
fluid pressure means for causing a fluid pressure to act on the attachment surface of the device body against the spring force of the spring means so that the engagement of the engaging means is released; and
transmission means for transmitting rotation of the spindle to the device body with the fluid pressure of the fluid pressure means acting on the attachment surface of the device body.

2. The spindle attachment device according to claim 1, further comprising:
a cylinder arranged concentrically with the axial line of the spindle, and
a piston accommodated in the cylinder of the fluid pressure means in such a manner that one end of the piston protrudes from the cylinder so as to be able to come in contact with the attachment surface of the device body.

3. The spindle attachment device according to claim 2, further comprising;
a movable clamp coupled with the protruding end of the piston, and
a fixed clamp for clamping the movable clamp, the fixed clamp being arranged on the attachment surface of the device body, so that according to rotation of the device body about the axial line of the spindle, the fixed clamp is positioned at an unclamp position and a clamp position with respect to the movable clamp, such that the fixed clamp at the unclamp position can freely move with respect to the movable clamp in the direction of the axis, and the movable clamp can come into engagement from the device body side with the fixed clamp at the clamp position.

4. The spindle attachment device according to claim 1, wherein the engaging means includes:
fixed teeth arranged on a first circumference, whose center is the axial line of the spindle, on the end face of the spindle head; and
movable teeth arranged on a second circumference, having the same diameter as the circumference on which the fixed teeth are formed, on the attachment surface of the device body.

5. The spindle attachment device according to claim 1, further comprising:
a guide hole formed at a center of the second circumference,
an axial guide hole formed in the spindle and having a peripheral surface,
a drawbar, a pull stud having an external surface, the pull stud being inserted into the axial hole of the spindle so as to allow coupling with the drawbar, wherein the pull stud is inserted into the guide hole in such a manner that the pull stud can move in the direction of the axial line of the spindle, an annular space formed between the peripheral surface of the guide hole and the external surface of the pull stud, an inward flange arranged on the peripheral surface of the guide hole, and an outward flange arranged on the external surface of the pull stud, wherein the spring means has a compressed coil spring accommodated in the annular space and interposed between the outward flange and the inward flange.

6. The spindle attachment device according to claim 1, wherein the transmission means includes a key arranged on the end face of the spindle and a key groove formed on the attachment surface of the device body, and wherein the key can be fitted into the key groove.

* * * * *